Figure 1:
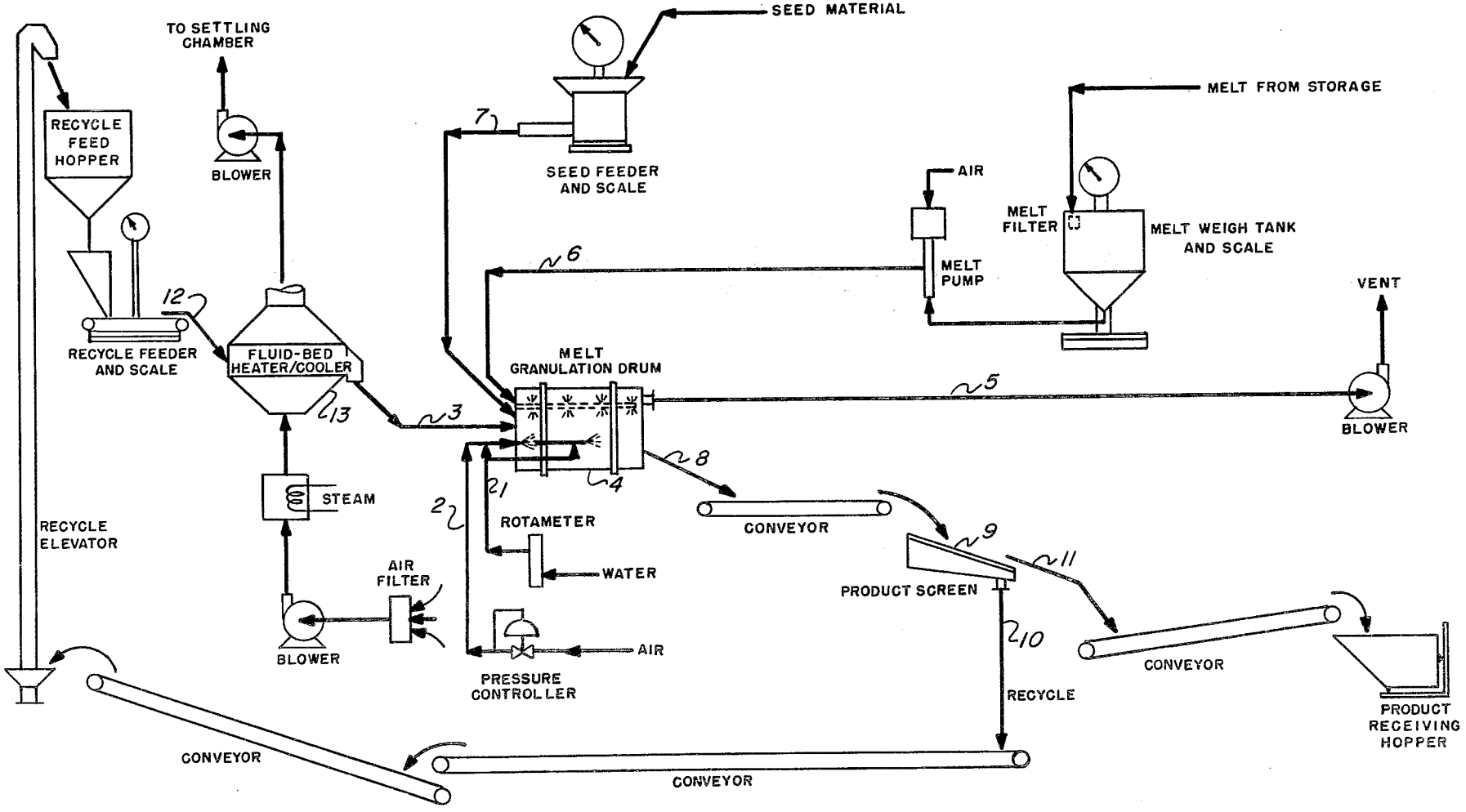
Figure 2:
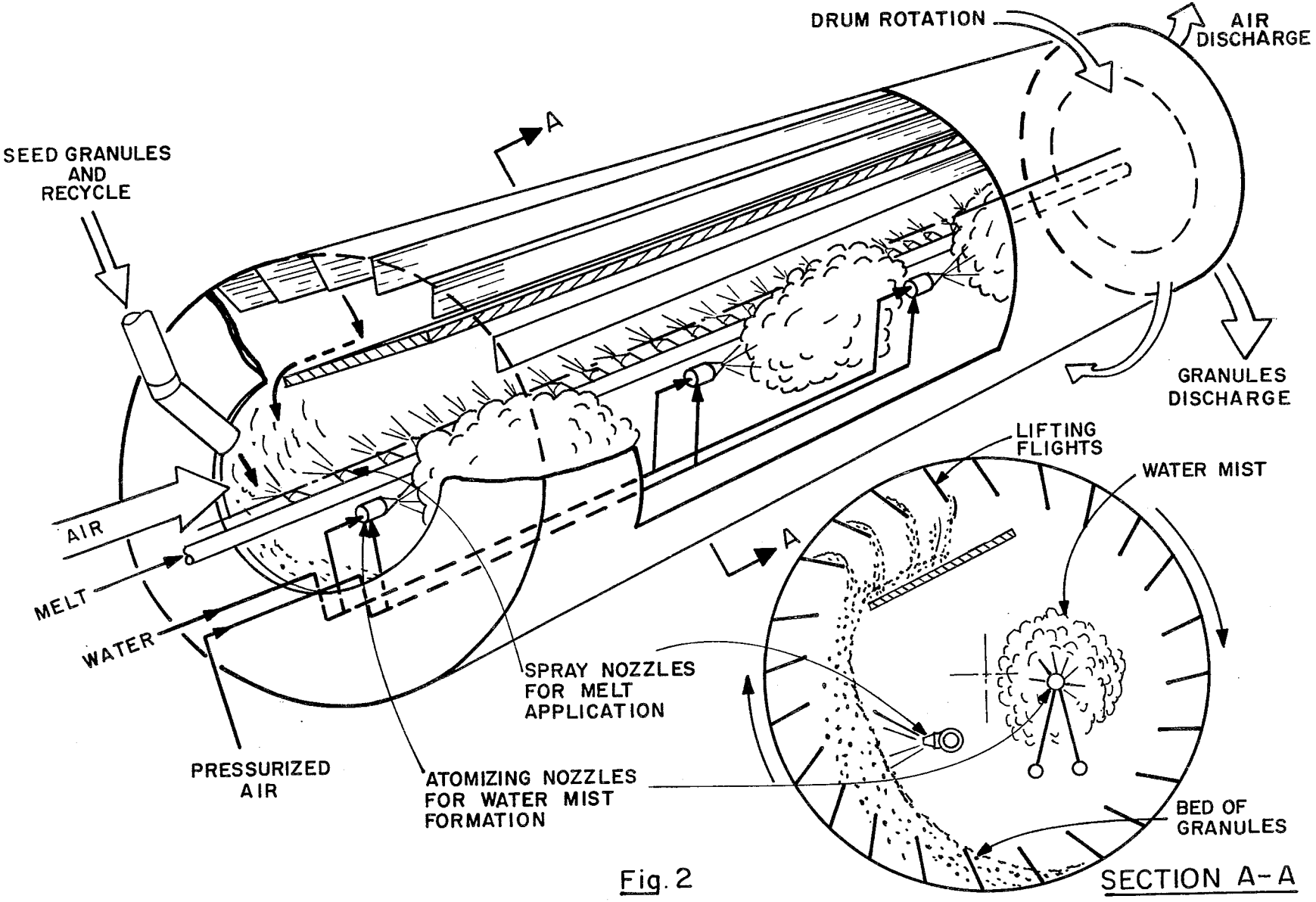

United States Defensive Publication [19] (H) [11] T980,005

Shirley, Jr. [43] Mar. 6, 1979

[54] GRANULATION AND COATING BY IMPROVED METHOD OF HEAT REMOVAL

[75] Inventor: Arthur R. Shirley, Jr., Florence, Ala.

[73] Assignee: Tennessee Valley Authority,

[21] Appl. No.: 850,588

[22] Filed: Nov. 11, 1977

[51] Int. Cl.[2] ..... B01J 2/02

[52] U.S. Cl. ..... 264/7; 264/14

[57] ABSTRACT

An improved process for the granulation or coating of hygroscopic or nonhygroscopic materials where melt is sprayed onto cascading granules of common or uncommon substrate in an enclosed vessel such as a rotary drum preferably with lifting flights which provide maximum mixing of the granules and the atmosphere enclosed in the unit and where heat given off by solidification of the melt is absorbed by evaporation of water which is atomized as an extremely fine mist into areas of the vessel which are not subtended by falling granules. Evaporation is effected without impingement of the mist on the granules or vessel internals. Air for evaporation is pulled through the vessel concurrent with the flow of granules and its moisture content is regulated below the critical humidity of the granules throughout the vessel. Some recycle of undersize granules discharged from the vessel is maintained for size control; however, examples show the recycle rate decreased by 87 percent over recycle cooled processes as 73 percent of the heat evolved is removed by evaporation of water mist. An equation is developed which mathematically represents the thermodynamics of the process and specific values are presented for variables when granulating sulfur or urea.

8 Claims, 2 Sheets Drawing,

31 Pages Specification

The file of this unexamined application may be inspected and copies thereof may be purchased (849 O.G. 1221, Apr. 9, 1968).

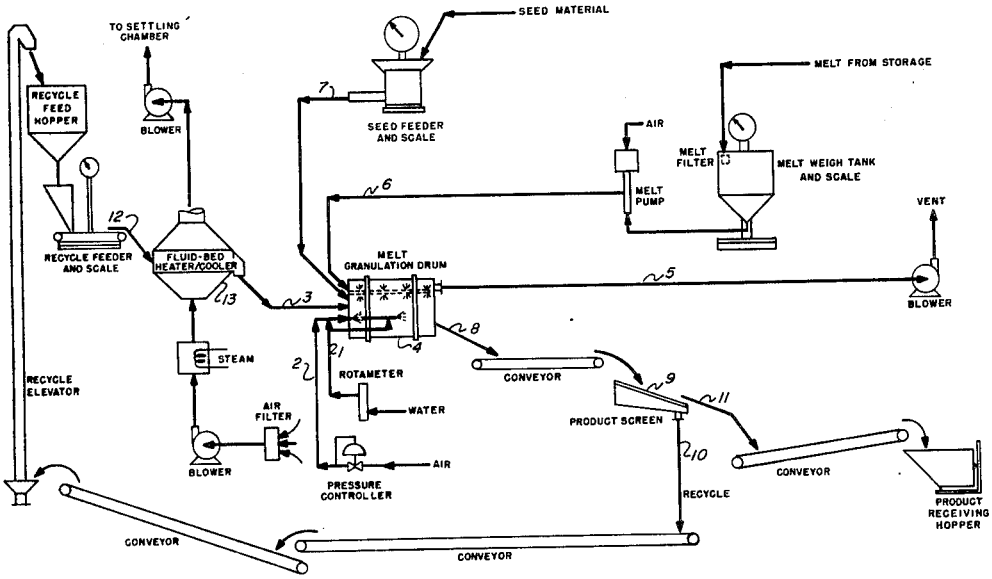

FLOW DIAGRAM OF THE MELT GRANULATION PROCESS WITH HEAT REMOVAL BY RAPID EVAPORATION OF WATER MIST

FLOW DIAGRAM OF THE MELT GRANULATION PROCESS WITH HEAT REMOVAL BY RAPID EVAPORATION OF WATER MIST